July 24, 1934.   H. ACHT   1,967,215
PHOTOGRAPHIC LENS SYSTEM
Filed Feb. 20, 1934
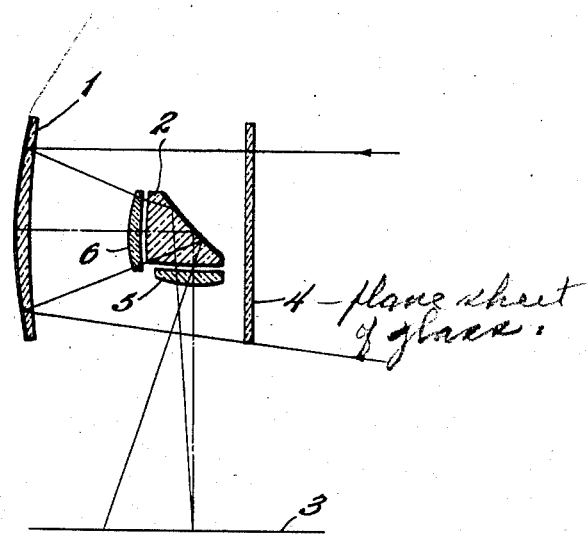
Inventor
Heinrich Acht
By A. D. Adams
Attorney Patented July 24, 1934

1,967,215

UNITED STATES PATENT OFFICE 1,967,215

PHOTOGRAPHIC LENS SYSTEM

Heinrich Acht, Berlin, Germany

Application February 20, 1934, Serial No. 712,222
In Germany February 15, 1933

4 Claims. (Cl. 88—57)

My invention relates to a photographic lens system wherein refracting as well as reflecting members are combined in such a manner that in spite of great focal length the overall dimensions are materially reduced.

The figure is a diagrammatic sketch of the lens system.

In accordance with my invention the new lens system consists of a mirror system or mirror which is mounted perpendicular to the optical axis and which has a positive focal length. Besides this primary system which reflects the light coming from the object to be photographed it comprises a secondary lens system mounted within the focal distance of the primary system said secondary lens system being of negative focal length. The axis of this secondary lens system forms an angle of preferably 90° with the lens axis proper.

I use for the first mirror system with positive focal length a preferably spherical or parabolical mirror 1 with its convex surface silvered or one or more lenses which can be either individually mounted or cemented to each other with silvering on the back.

The secondary mirror system of negative focal length can be and preferably is in my invention a prism 2 the surfaces of which may be either spherical or plane. The hypotenuse plane is silvered and this prism is shown as being combined with one or more lenses 5 and 6 which in turn can be either individually separated from each other and from the prism or cemented together or to the prism.

In the present example, the separate lenses 5 and 6 are concavo-convex and are slightly spaced from the convex faces of the prism. The hypotenuse mirror face of the prism is shown as being concave so that the reflecting surface is convex. This arrangement has been found to be very satisfactory in that it produces very sharp and undistorted pictures or images. Also, it reduces the overall dimensions of the camera. In this respect, the invention is an important improvement on the lens system disclosed in my copending application, Ser. No. 712,221 filed Feb. 20, 1934. Moreover, the arrangement makes it possible to use larger photographic plates or negatives with the same size primary mirror and lens because the size of the exposure is not limited by a hole through the primary mirror.

To prevent lateral light from entering into the lens system I have provided a plane sheet of glass 4 which is mounted preferably perpendicularly to the optical axis.

The system will be more clearly understood by having reference to the figure which shows diagrammatically one embodiment of my invention and by following the path of the light through the lens systems.

The rays coming from the object to be photographed (not shown) are reflected by means of the primary mirror system 1 onto the secondary combined mirror and lens system 2. Thence, they are reflected to the focal plane 3 where they form a real image of the object which has been focussed. This secondary system, which comprises in combination a prism, the hypotenuse of which is silvered and a plurality of individual or cemented lenses, reflects the light to the plate at an angle of preferably 90°. It is understood, however, that other angles can also be used for the same purpose but it is important that the plane 3 does not in any way interfere with light received by the primary lens system.

By choosing suitable dimensions of the radii of the mirror systems and the right glass materials for the lenses all errors of the lenses can be compensated.

Having thus described the principle of my invention, what I claim is:

1. A photographic lens system corrected for spherical chromatic and astigmatic errors comprising, in combination, a primary collecting and reflecting mirror and lens system perpendicularly mounted to the optical axis and having a positive focal length, a relatively small secondary lens and mirror system on the optical axis within the focal distance of the primary system and consisting of a combination of mirror and a plurality of lenses and having a negative focal length, the optical axis of said secondary system forming an angle with the optical axis of said primary system to direct rays laterally of the optical axis of the primary system and adapted to form a real image on the resultant focal plane of the entire system.

2. A photographic lens system comprising, in combination, a primary collecting and reflecting mirror having a positive focal length, a relatively small secondary lens and mirror system on the optical axis within the focal distance of the primary mirror, said secondary system consisting of a combination of a mirror and a plurality of lenses and having a negative focal length, the optical axis of said secondary system forming an angle with the optical axis of said primary mirror to direct rays laterally of the optical axis and adapted to form a real image on the resultant focal plane of the entire system.

3. A photographic lens system comprising, in combination, a primary collecting and reflecting mirror and lens system having a positive focal length, and a relatively small secondary lens system within the focal distance and on the axis of said primary system, said secondary system comprising a prism having a mirrored hypotenuse face at an angle to the optical axis of the primary system, a lens between the prism and the primary mirror adjacent to one side face of the prism and a lens adjacent to the other face of the prism, said secondary lens and mirror system having a negative focal length and directing the rays laterally of the optical axis to produce a real image on the resultant focal plane of the entire system, and all of said lenses being corrected for chromatic and astigmatic errors.

4. The photographic lens system set forth in claim 1, wherein the secondary lens system includes a prism having a mirrored hypotenuse face intersecting the optical axis of the primary system at approximately 45%.

HEINRICH ACHT.